United States Patent [19]

Teller

[11] 4,337,229
[45] Jun. 29, 1982

[54] TREATMENT OF FLUE GASES

[75] Inventor: Aaron J. Teller, Westboro, Mass.

[73] Assignee: Teller Environmental Systems, Inc., Worcester, Mass.

[21] Appl. No.: 214,134

[22] Filed: Dec. 8, 1980

[51] Int. Cl.$^3$ .................... C01B 17/16; C01B 31/20; C01B 17/00; B01J 8/00

[52] U.S. Cl. ................................ 423/225; 423/242; 423/245

[58] Field of Search .......... 423/242 A, 242 R, 244 A, 423/244 R, 225, 245 S, 245 R; 55/73; 162/51

[56] References Cited

U.S. PATENT DOCUMENTS 3,906,078 9/1975 Hausberg et al. .............. 423/242 A
4,049,399 9/1977 Teller ....................................... 55/73
4,113,840 9/1978 Hanway et al. ..................... 423/242

Primary Examiner—O. R. Vertiz
Assistant Examiner—Gregory A. Heller

Attorney, Agent, or Firm—Thompson, Birch, Gauthier & Samuels

[57] ABSTRACT

A method for the treatment of an effluent gaseous stream from a Kraft Recovery Boiler or the like. The effluent stream passes through a venturi section where nucleation of the particulates is initiated and larger particles collected. Subsequently, the stream flows from the venturi section with the nucleated particulates and is scrubbed to remove the particulates, TRS and sulfur dioxide. A portion of the bottoms from the packed section is recycled back to the venturi section as 15–25% dissolved solids by weight. The total solids of the liquid stream in the venturi section is maintained at 1–5% above saturation. Further concentration of a slip-stream is achieved by cyclonic separation or filtration. The pH in the venturi section is controlled to agglomerate the suspended solids. The bottoms from the venturi section are subsequently concentrated externally to the venturi section to between 40-60% solids.

12 Claims, 3 Drawing Figures

TREATMENT OF FLUE GASES

BACKGROUND OF THE INVENTION

The invention relates to an efficient and economical process for treating recovery boiler emissions comprising particulates such as sulfur oxides, hydrogen sulfides and organic sulfur compounds from an industrial gas stream. More particularly, the invention is an improvement of the process disclosed in my U.S. Pat. No. 4,049,399, issued Sept. 20, 1977, entitled "Treatment of Flue Gases."

Mixed emissions of this type are typically found in Kraft and sulfite recovery processes in the pulp and paper industries. For example, emissions from Kraft recovery boilers generally consist of hydrogen sulfide and organic sulfur compounds (designated TRS for total reduced sulfur), $SO_2$ and particulates. The organic sulfur compounds normally consist of mercaptans, such as methyl mercaptan; mercapto ethers, such as dimethylsulfide; and disulfides, such as dimethyl disulfide. Some references also indicate the presence of carbonyl sulfide (not considered part of TRS).

The quantity and composition of the emissions are a function of boiler feed and loading, boiler operation and process sulfidity. Typical compositions of such boiler emissions are set forth in my referenced patent.

Briefly, in my prior invention, the emissions were treated in a two-stage process to remove the particulates, etc., and the removed materials consisting of salts of the acid gases and captured particulates were returned to the pulping operation at a concentration of about 20% dissolved solids. Before this stream could be reused in the recovery boiler, it had to be concentrated in pre-evaporators to approximately 60% solids.

In the initial operation of my patented process, the effluent stream to be processed passed through an electrostatic precipitator, into a low energy venturi section and was subsequently scrubbed in a packed section. A liquid slipstream containing in the order of 500-3000 lbs/hr of dissolved solids at a concentration of $\simeq 20\%$ was realized.

In the practice of the inventive process, it was found that the system efficiency for particulate collection improved with increased solids inlet loading to maintain a constant particulate outlet level. Thus, as a practical matter, the use of the electrostatic precipitator was eliminated. However, with no electrostatic precipitator, this resulted in a system discharge to the pre-evaporators of a 20% solution containing in the order of 10,000 lbs/hr of dissolved solids as compared to 500-3000 lbs/hr when the electrostatic precipitator was used. To concentrate this stream from 20% to 60% created a stream equivalent demand approximately seven times greater than when the electrostatic precipitator was used. Further, the high concentration of sodium sulfate in the slipstream resulted in a deposition of sodium sulfate in the evaporators thus increasing maintenance costs. Because of the high efficiency of the process per se, which functioned more effectively at a high loading inlet level of particulate material, the economic and operational advantage of by-passing the electrostatic precipitator resulted in a deterrant in the economic and operational performance of the pre-evaporators associated with the recovery boiler.

BRIEF SUMMARY OF THE INVENTION

The present invention broadly comprises a method of treating the effluent emmissions from a Kraft pulp boiler or the like to recover particulates, sulfur dioxide and TRS from the effluent and return to the boiler a slipstream containing 40-60% solids concentration. This method does not require the use of an electrostatic precipitator and as a practical matter eliminates the need for a pre-evaporation step upstream of the concentrator or boiler.

It has been found in work with solids emitted from a recovery boiler, suspended in a saturated solution of the salts recovered or formed and reagents added consisting of $Na_2SO_4$, $Na_2CO_3$, $Na_2S_2O_3$, $NaHCO_3$, and $NaCl$ that a stable colloid results with settling rates of the order of one inch per hour. This phenomenon, totally unanticipated in salt solutions, could result in blockage and plugging of piping, instruments, and equipment and is a major cause of foaming during recovery of effluents.

The cause of this unanticipated behavior (based on available knowledge of saline solutions and suspensions) may be due to the small particle size of the particulate (20-60% below 1 micron) resulting in development of surface charges inhibiting agglomeration, or protective insoluble coatings of organics that have condensed on the particulate inhibiting wetting and agglomeration. The phenomenon, however unanticipated, would inhibit the viability of my process for high concentration recovery and is a major cause of foaming during recovery of effluents.

In my present invention, a portion of the bottoms from the first state (venturi section) are recycled. A portion of the solids collected in the first stage remain undissolved and in suspension in the recycle stream. It is important that these suspended solids settle at a reasonable rate for at least two reasons: if totally suspended and at high concentrations, the solids can coat and foul the operating equipment, thus causing blockages; and, if readily separated, then the recovery can be conducted at lower total solids concentrations than the product requires and the solids can be concentrated in the suspending liquor external to the recovery equipment.

I have found that by adjusting the pH of the suspension, there is caused a rapid agglomeration of the particulates resulting in a final particle average size of 40-100 microns which causes a rapid settling of the order of 0.5-1 ft/min.

Broadly, the invention comprises passing an effluent stream containing particulates, TRS and sulfur dioxide through a venturi section to initiate nucleation of the particulates. In the preferred embodiment, a wetted fan is upstream of the venturi. In an alternative embodiment, the wetted fan is downstream of the venturi. This stream flows from the venturi section through a packed section and is scrubbed to remove particulates, TRS and sulfur dioxide at a 15-25% concentration of dissolved solids. A portion of the bottoms from the packed section is pumped to the venturi section to further recover the particulates and a portion of the TRS and $SO_2$. A portion of the bottoms from the venturi section is recycled. The concentration of solids of this recycled stream is maintained at 0.5-5% above saturation. The pH in the venturi section is controlled to agglomerate the suspended solids. The bottoms from the venturi section are concentrated externally to the venturi section and the final concentrated stream returned to the concentrator or boiler.

One of the preferred embodiments of the invention includes introducing the effluent stream into a low energy venturi section, initiating nucleation of the particulates in the effluent stream, passing subsequently the stream through a distinct packed section, washing the stream with an alkaline liquor to remove particulates, TRS and sulfur dioxide from the stream, collecting the liquor from the packed section, recycling a first portion of the liquor at 15-25% dissolved solids through the packed section, passing a second portion of the collected liquor at 15-25% dissolved solids to the venturi section, removing and collecting at least a portion of the particulates and some of the TRS and $SO_2$ in the venturi section, recycling the bottoms of the venturi section, the concentration of solids in this recycled stream at approximately 1-5% above the saturation limit, promoting agglomeration of these suspended solids, and concentrating the bottoms from the venturi section external to the venturi section to a slurry at 40-60% solids concentration.

An alternative embodiment of the invention includes flowing the stream from the venturi through a washed fan to effect a second nucleation of the particulates prior to passing the stream through the packed section, and recycling a portion of the stream from the packed section back to the venturi.

DESCRIPTION OF THE PREFERRED EMBODIMENT

Figure 1:
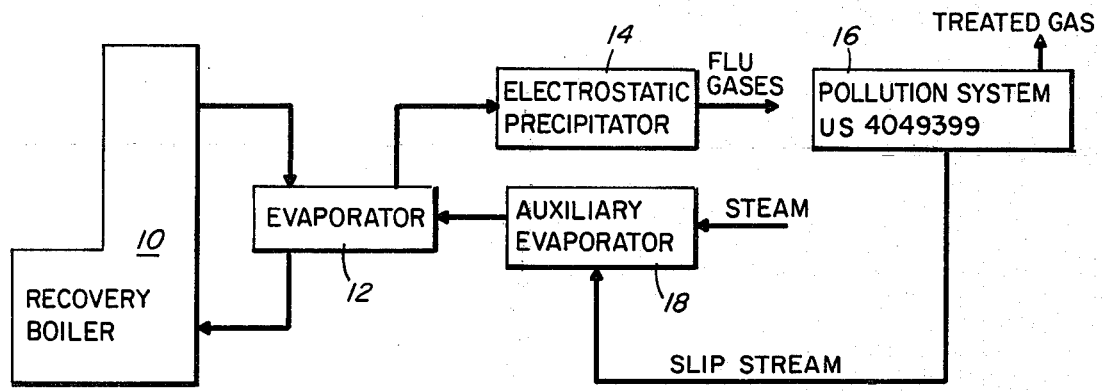
FIG. 1 is a schematic of the prior art.

A prior art process for treating emissions from Kraft boilers is shown illustrating in FIG. 1. A recovery boiler 10, such as employed in pulp manufacture receives a recycled stream containing approximately 60% solids from an evaporator 12. The gaseous discharge from the evaporator 12 flows through an electrostatic precipitator 14 and then to a pollution control system 16 as described and claimed in U.S. Pat. No. 4,040,399. The slipstream from the pollution control system 16 at a concentration of approximately 20% dissolved solids at a flow rate of 2-50 gpm is introduced into a multiple effect evaporator 18 where the concentration of solids is increased from 20% to 60%. The cost of steam for evaporation to the 60% concentration level from the 20% concentration level is indicated in Table 1.

In the present process, the concentration of the slipstream is approximately 40-60%.

In the operation of the patented process, it was found that the system efficiency improved with increased solids inlet loading to maintain a constant particulate outlet level. In some instances, the electrostatic precipitator 14 was by-passed and the volume of the slipstream back to the pulping process increased. Where no electrostatic precipitator was used, the discharge to the evaporator 18 of a 20% solution was at a flow rate of 10,000 lbs/hr dissolved solids compared to 2,500 lbs/hr when the electrostatic precipitator was used. To concentrate this stream to a 60% concentration created a cost of steam equivalent to $200,000-$600,000 per year. These relative costs are set forth in Table I below.

TABLE I

| CONCENTRATION COST FOR SLIPSTREAM FROM TELLER SYSTEM | | |
|---|---|---|
| Solids Returned to Process lb/hr | Steam Cost $/yr to Conc. to 60% 8000 hr/yr at $2/10^6$ Btu (once through steam) | |
| | Return at 20% Conc. | Return at 50% Conc. |
| 1,000 | 53,300 | 5,300 |
| 1,500 | 80,000 | 8,000 |
| 2,000 | 106,700 | 10,670 |
| 3,000 | 160,000 | 16,000 |
| 4,000 | 213,300 | 21,330 |
| 6,000 | 320,000 | 32,000 |
| 8,000 | 426,700 | 42,670 |
| 10,000 | 533,300 | 53,300 |

The high concentration of sodium sulfate in the slipstream resulted in deposition of the sodium sulfate in the evaporators 18, thus increasing maintenance costs. Therefore, the efficiency of the patented process and the advantage of by-passing the electrostatic precipitator resulted in a deterrant in the economic and operational performance of the evaporators.

Figure 2:
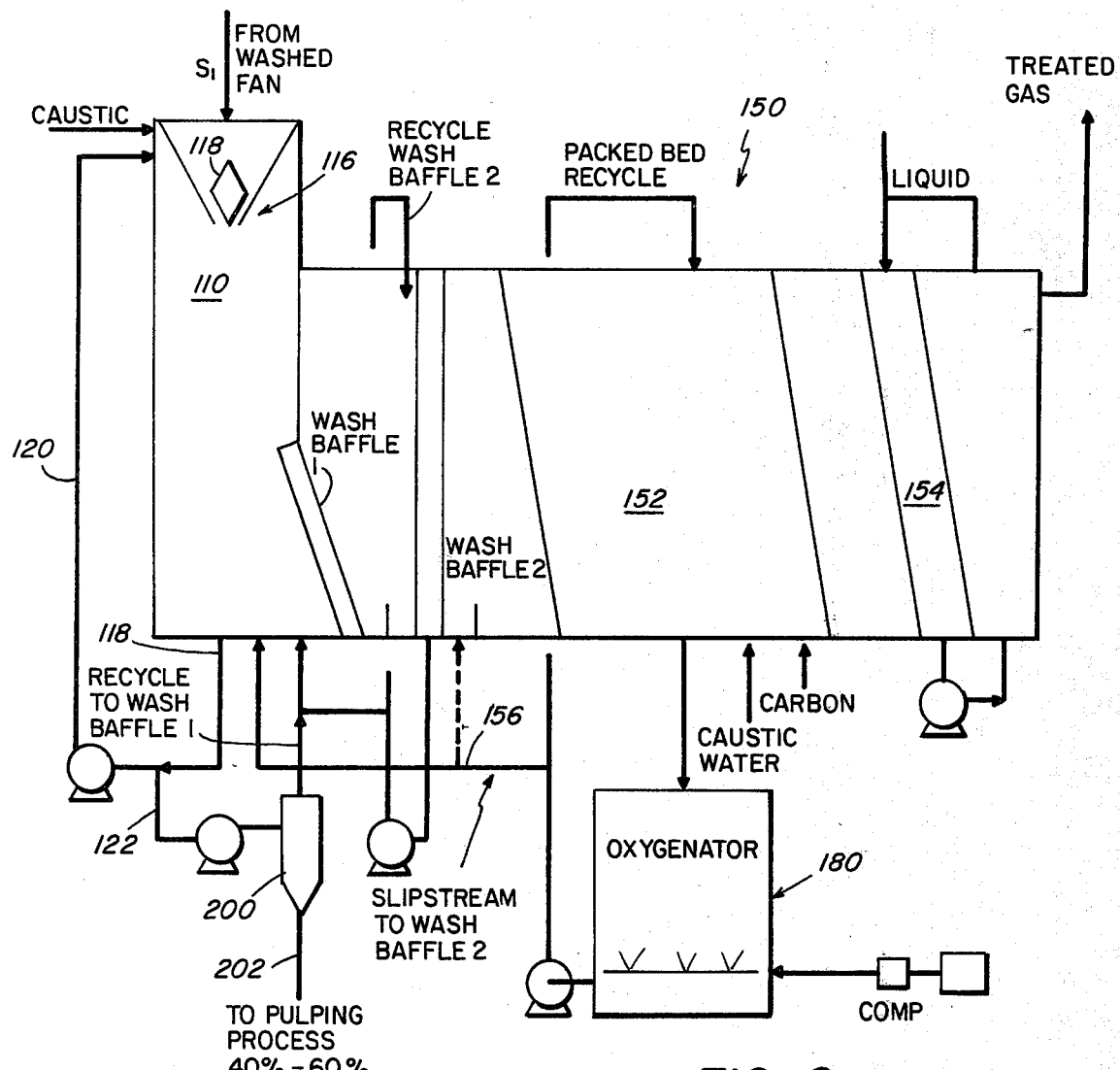
FIG. 2 is a simplified process flow diagram of the invention.

Referring to FIG. 2, a system of the preferred embodiment comprises a venturi-section 110 communicating with a packed section shown generally at 150 and an oxygenator 180. The oxygenator 180 has been shown separately from the packed section 150 but as with the apparatus of the above-referenced patent, it may be a structurally integral part of the packed section.

A hot inlet gas stream $S_1$, typically at a temperature of about 300°-500° F. and a dew point of about 150°-185° F., is introduced by means of a washed fan (not shown) into the venturi section 110. This gas stream is subjected to a liquid spray quench prior to and/or simultaneously with reaching the venturi throat 116. A plug 118 having an essentially diamond-shaped cross-section is inserted in the venturi throat 116 and has been found to improve the efficiency of recovery. Venturi 110 is operated at a lower pressure drop of the gas therethrough than more conventional venturis heretofore employed to remove particulates. The pressure drop of the gas therethrough is less than 20 and preferably, less than about 10 inches of water. In particular, the use of a venturi with a diamond-shaped plug as shown has been found to facilitate the removal of intermediate size particles less than about 0.8 microns at this stage of the process, and such particles drop out of the gas stream either by action of gravity or by impinging contact with the spray formed in the venturi throat.

The gas stream $S_1$ cooled but still at a temperature above 150° F. and moisturized to near saturation by the action of the liquid quench is next channeled through one or more sets of baffles which are continuously washed by a wash liquor. Emerging from the baffle system, nucleation of the submicron particles occurs with the gas substantially saturated with water vapor at a temperature of at least 150° F. to 180° F. The gas together with the entrained nucleated particles is then passed through the packed sections 152 and 154.

More particularly, the gas together with the entrained, nucleated particles is then passed in an essentially horizontal path through sections 152 and 154, packed with any suitable packing material, preferably the packing material disclosed in U.S. Pat. No. 2,867,425, also described in U.S. Pat. No. 3,324,630, and available commercially. The gas in section 152 is brought into cross-flow contact with a scrubbing liquor that is continuously sprayed into the section. The number of sections, the size of the sections, and the number of nozzles per section is varied to suit individual process requirements. The structure and operating characteristics of the packed section 152 is as described in my aforementioned patent and need not be repeated here in detail. The gas is then passed through section 154 which is washed with recirculating wash liquid and makeup water to remove any entrained liquor containing TRS and solids.

The packing materials in the sections 152 and 154 shown in FIG. 2 are inclined at an angle of about 8°–13° from the vertical in the direction in which the gas is moving. Such a construction is not critical but helps to prevent maldistribution of the liquor in the packing and thus, insures full use of the packed section. The scrubbing liquor and wash liquid from sections 152 and 154 respectively, together with particulates are drained to the bottom of the respective sections through packing support gratings which are of such size that the packing is supported while the liquid and suspended particulates pass through and into collection sumps. The liquor from the section 152 flows to the oxygenator 180. From the oxygenator 180, a vent gas passes to the packed section 152. A first portion of the liquor is recycled through the section 152 and a second portion of the liquor forms a slipstream 156 which flows to the venturi section 110 or alternatively to wash baffle 2 as shown in dotted lines.

To replace liquids lost with the gas and withdrawn with slipstream 156, and to maintain the desired concentration of carbon and alkali during use, fresh makeup water is supplied, concentrated caustic is added and carbon slurry is added. Also, activated carbon in the liquor slurry is aerated.

The preferred scrubbing liquor for this invention is an alkaline aqueous slurry of activated carbon having a particle size range preferably in the range of 0.05–20 microns and a pH of about 8–13, more preferably 8–9.5. The alkaline material in the scrubbing liquid may be soluble sodium or potassium salt such as sodium hydroxide, sodium bicarbonate or the like to a relatively insoluble alkaline earth metal salt such as lime or calcium carbonate in slurry form. Sodium hydroxide is preferred.

The removal of $SO_2$ and TRS by the scrubbing liquor is based on sorption and chemical reaction with hydroxide and oxygen. $SO_2$ is converted to sulfates and TRS to oxidized sulfur compounds. $H_2S$ for example is converted at least in part to $Na_2S_2O_3$. Such compounds are not volatile and can be recirculated in the scrubbing liquor as dissolved or suspended salts. In addition to the oxidized materials, the scrubbed particles, principally carbonates and sulfates of sodium, recirculate with the scrubbing liquor.

Maximum recirculation of scrubbing liquor is an important part of the present invention for reasons of cost and efficiency. With prior art processes the highest solids or non-volatile content, i.e., the content of materials which are essentially non-volatile at 212° F., that can be recirculated is about 15% by weight. With the present process, however, the non-volatile content may be as high as 25% and is preferably in the range of 18–25% by weight. The cross-flow scrubber of this invention is stable at such high salt content.

Cross-flow scrubbing has other important advantages in the present invention. The ratio of scrubbing liquor to gas flow rates can be varied along the depth of the packing, i.e., in the direction of gas flow, as can the size of the packing elements. Also, different liquors of different composition or concentration can be employed and recirculated. Preferably, higher flow rates of the same scrubbing liquor are employed in upstream portions of the packing where the $SO_2$ and TRS concentrations in the gas are highest. Thus, the ratio of alkali (and oxygen) to $SO_2$ and TRS (and acid particulates, such as $NaSO_4$) in the gas can be varied with the depth of packing.

Sufficient alkali and carbon are required for efficient reaction and removal of contaminants but excess should be avoided for economy and to limit corrosion. Alkaline pH is necessary but the pH should be below about 9.5, and preferably 9.3, to avoid reaction with $CO_2$. With well-oxygenated, activated carbon, a carbon content between about 0.3% and 0.40% by weight is suitable and about 0.05% to 0.30% is preferred. These values are lower, for a given removal efficiency, with the present invention than with prior processes because the scrubbing liquor flow in the cross-flow scrubber is laminar over the packing, rather than turbulent. With laminar flow, it is believed that the suspended carbon migrates to the surface of the flowing liquor and concentrates in the most active portion of the scrubber liquor, that is, the portion in contact with the gas. Below about 200 PPM of TRS in the gas, it has been found that a bulk concentration of carbon in the weight range of about 0.03% to 0.07% is sufficient and above 200 PPM TRS, a range of about 0.08% to 0.25% is sufficient. Thus, a carbon concentration range between about 0.03% to about 0.30% by weight is preferred, the particular value selected being a function of operating conditions and TRS inlet concentration in the gas.

To maintain the non-volatile concentration in the recirculated scrubbing liquor, the slipstream of liquor 156 is bled off and returned for processing to the venturi section 110 or wash baffle 2. The high non-volatile concentration in the slipstream permitted by this invention is advantageous because a minimum of carbon and unreacted alkali are thereby withdrawn with the slipstream and less heat is required to remove water for concentrating the salts recovered in the slipstream. Fresh makeup water and fresh alkali and carbon are added as required to maintain pH and carbon concentration in the scrubbing liquor.

For the reasons given above, the consumption of alkali and carbon in the present process are low, generally in the range of 0.3 to 0.6 pounds carbon and about 9 to 30 pounds of alkali, measured as NaOH, per ton of air dried pulp processed, depending on the specific process conditions and control, and the type of wood being pulped. These relatively low values are important since such consumption is estimated to constitute the largest single item of cost in operating the process, including amortization of equipment. Properly operated, it is estimated that the economic value of recovered salts returned to the pulping process can exceed the total costs of operating the flue gas treating process of this invention.

The cross-sectional area of the packed scrubber is chosen to accomodate the flow rate of gas to be treated and the depth of packing, with respect to the direction of flow of gas, is chosen to provide the required removal of contaminants to the extent desired, greater depth providing increased removal within the limits of the process. The required depth can be provided in continuous or separated sections scrubbing liquor flow over the surface of the packing, and can be varied along the depth of packing as described.

The slipstream 156 from the oxygenator 180 at 20% solids is pumped to the venturi section 110 or the wash baffle 2 at a flow rate of 10–30 GPM, i.e., 20 GPM and a temperature between about 150°–165° F.

To maintain a proper material balance, the concentration of solids in the venturi section 110 is increased to 0.5–5% above saturation concentration by solution and suspension based on the particulates, TRS and sulfur dioxide. The liquid bottoms from the section 110 are recycled at 0.5% solids above saturation concentration. One portion of the bottoms, line 118, is recycled in the venturi section via line 120 at a flow rate of 4000 GPM and a temperature between about 150°–165° F. to recover the particulates and a portion of the TRS and sulfur dioxide. The other portion is pumped, line 122, to a separator 200 external to the venturi section 110. The bottoms, line 202, from the separator 200 at a solids concentration of 40–60% (10–30% above the saturation concentration) and a flow rate of 20 GPM are ultimately concentrated to 60% solids, if necessary, or mixed with the major black liquor stream to the pulping process.

The pH in the venturi section 110 is adjusted from a natural pH of 5.5–7.5 to a range of 8.0–9.5 preferably 8.5–9.0 by the addition of a caustic material, such as NaOH, a material normally used as makeup in the pulping process. When the proper pH is reached, there is an extremely rapid agglomeration and settling of the captured particulate. Thus, the section is operated at a relatively low concentration. The reliability of the scrubbing circulation system is enhanced.

The following table illustrates the system operated with the easily separated solids.

| Saturation Concentration of Salts in Solution, Percent | SLURRY-PERCENT TOTAL SOLIDS DISSOLVED & SUSPENDED | | SLURRY-PERCENT TOTAL SOLIDS DISSOLVED & SUSPENDED | |
|---|---|---|---|---|
| | Line 202 | 118 | 202 | 118 |
| 30 | 40 | 32 | 55 | 33.8 |
| 32 | 40 | 33.6 | 55 | 35.5 |
| 34 | 40 | 35.2 | 55 | 37.2 |
| 36 | 40 | 36.8 | 55 | 38.9 |
| 38 | 40 | 38.4 | 55 | 40.6 |

With the present invention, the higher concentration results in a savings of 90% of the total thermal costs over the prior art. More importantly, although the concentration of the sodium bicarbonate in the final venturi liquid is the same as the concentration of the packed zone, the volume of the liquid slipstream 156 as compared with the prior art is reduced by 75% and therefore, the consumption of caustic soda excess is also reduced by 75%.

Figure 3:
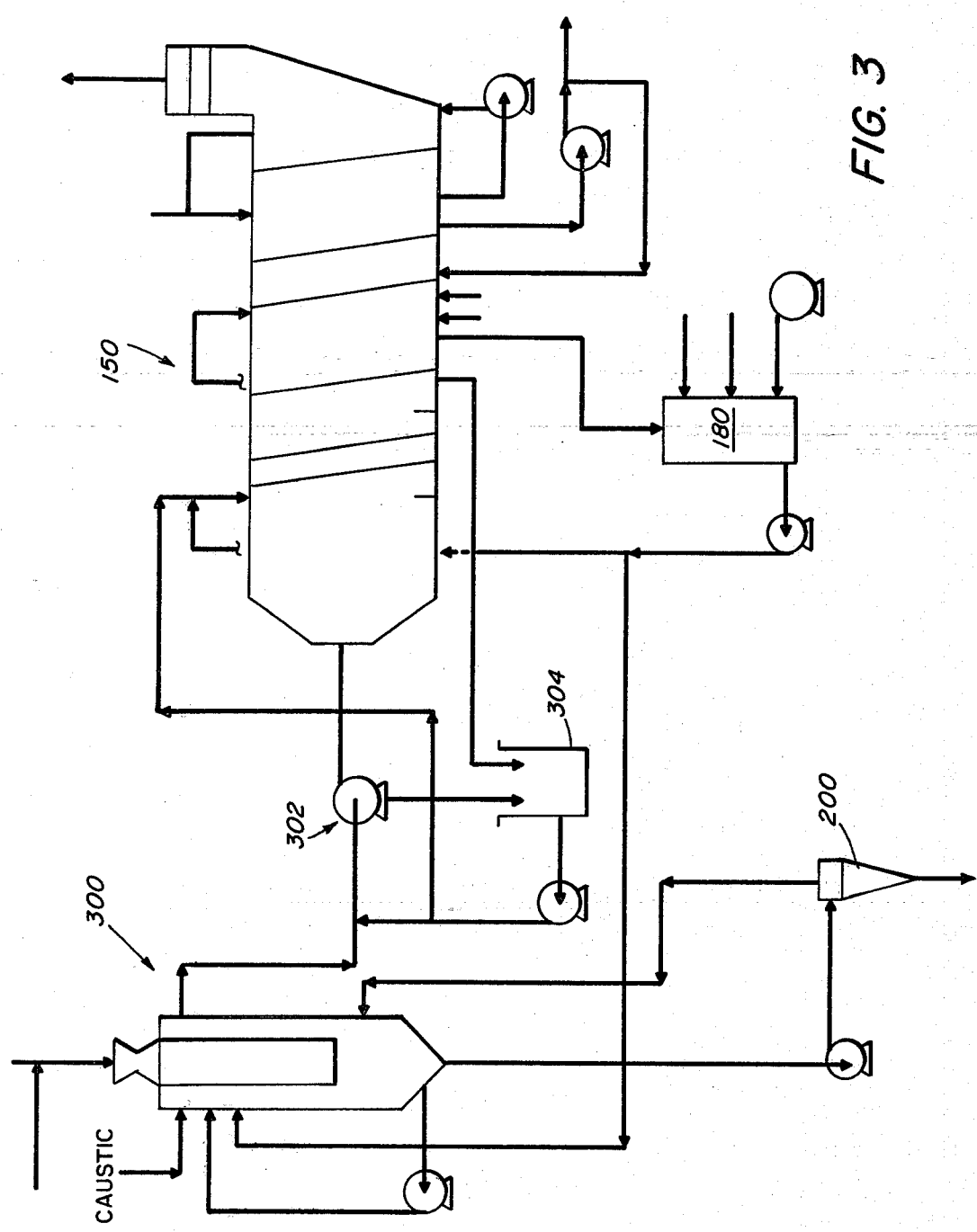
FIG. 3 is a simplified process flow diagram of the alternative embodiment of the invention.

Also, as a result of breaking the stability of the suspension of the suspended solids the advantages of energy conservation are achieved by returning concentrated material to the process and avoiding the necessity for thermal-evaporative concentration, while operating the system with a liquor containing minimum suspended solids.

Where it is desired not to subject the washed fan to high particulate loading, the alternative embodiment shown in FIG. 3 is used. In this embodiment, the gaseous stream having a particulate level of from 1 to 8 grains/DSCF, say for example 5 to 6 grains/DSCF, is introduced into a cyclone venturi 300. The gaseous stream discharged from the venturi containing 0.5 to 1 grains/DSCF is introduced into a washed fan 302. The washed fan effects nucleation of the particulates with the result that the gaseous stream as ultimately discharged from the packed section, contains 0.01 to 0.04 grains/DSCF and typically, less than 0.05 grains/DSCF.

The material and energy balances for this embodiment are substantially the same as for the embodiment of FIG. 2 except that a part of the makeup water is added to vessel 304 at approximately 20 GPM. This stream is combined with the output from the washed fan 302 at a temperature of approximately 160° F. and a flow rate of 110 GPM. From vessel 304 a portion of the liquid is recycled to the fan 302 at a flow rate of about 110 GPM at 160° F. and a portion of this liquid is recycled to the packed section at a rate of about 20 GPM.

Having described my invention, what I now claim is:

1. A process for treating an effluent gas containing entrained particulates, hydrogen sulfide, organic sulfur compounds, and sulfur dioxide, said gas having a temperature above 150° F., which includes:
   (a) initiating nucleation of the particulates in a first enclosure by treating the gas to increase its turbulence and to increase its humidity substantially to saturation at a wet bulb temperature above about 150° F. to about 185° F. under substantially adiabatic conditions, the pressure drop of said gas in said first enclosure being less than about 15 inches of water;
   (b) passing said saturated gas which is at a temperature between about 150° F. to 212° F. in a substantially horizontal path through a second enclosure containing packing;
   (c) passing a scrubbing liquor comprising an aqueous alkaline slurry of activated oxygenated carbon downwardly over said packing under laminar flow conditions;
   (d) exhausting said gas from said second enclosure;
   (e) collecting a first portion of said liquor after passage through said packing and recirculating said first portion through said packing, said portion containing at least about 15% and less than saturation non-volatile material by weight;
   (f) passing a second portion of said liquor as a liquid stream to the first enclosure to recover particulates and a portion of the hydrogen sulfide, organic sulfur compounds and $SO_2$;
   (g) increasing the concentration of solids in the liquid stream of step (f) in said first enclosure to approximately 0.5–5% above saturation concentration of the materials to be recovered;
   (h) providing an environment in the first enclosure for agglomeration of the suspended solids to promote rapid separation of the liquid and suspended solids;
   (i) recycling in the first enclosure one portion of the bottoms with a solids concentration of from 0.5–5% above saturation concentration; and,
   (j) concentrating another portion of the bottoms from the first enclosure to a 40–60% total solids mix.

2. The method of claim 1 wherein the size of a portion of the particulates are below 1 micron prior to their nucleation in the first enclosure.

3. The method of claim 1 wherein the first enclosure includes a venturi section.

4. The method of claim 1 which includes adding a caustic to said first enclosure to control the environment therein.

5. The method of claim 4 wherein said caustic is sodium hydroxide.

6. The method of claims 4 or 5 wherein the pH range in the first enclosure is maintained between about 8.0–9.5.

7. The method of claim 6 wherein the pH range is 8.5–9.0.

8. The method of claim 4 which includes increasing the average particle size of the suspended droplets in the first enclosure to between about 40–100 microns.

9. The method of claim 8 wherein the settlement rate of the particulates treated in the first enclosure is between about 0.1–1.5 ft/min.

10. The method of claim 1 wherein the second portion of the liquid bottoms from the second enclosure contains between about 15–25% non-volatile material by weight.

11. The method of claim 1 which includes effecting a second nucleation of the particulates in the gaseous stream between the first and second enclosures.

12. The method of claim 11 which includes effecting the nucleation by flowing the gaseous stream through a washed fan which is disposed intermediate the first and second enclosures.

* * * * *